United States Patent [19]
Phillips

[11] Patent Number: 5,765,961
[45] Date of Patent: Jun. 16, 1998

[54] ADAPTABLE MOUNTING ARRANGEMENT FOR SHAFT-CARRIED SPEED REDUCER

[75] Inventor: Allyn E. Phillips, Simpsonville, S.C.

[73] Assignee: Reliance Electric Industrial Company, Cleveland, Ohio

[21] Appl. No.: 863,998

[22] Filed: May 27, 1997

Related U.S. Application Data

[63] Continuation of Ser. No. 468,363, Jun. 6, 1995, abandoned.

[51] Int. Cl.$^6$ .................................................... F16B 2/00
[52] U.S. Cl. .................................. 403/367; 403/3; 403/4; 403/360; 403/371; 474/903
[58] Field of Search .................... 403/3, 4, 367, 403/368, 369, 370, 371, 360, 375; 474/903

[56] References Cited

U.S. PATENT DOCUMENTS

| | | | |
|---|---|---|---|
| 1,655,734 | 1/1928 | McWilliams | 403/370 X |
| 2,680,633 | 6/1954 | Brown . | |
| 2,816,452 | 12/1957 | McCloskey . | |
| 2,889,161 | 6/1959 | Powell et al. . | |
| 2,946,611 | 7/1960 | Moyer . | |
| 3,101,962 | 8/1963 | Nunlist | 403/368 |
| 3,373,626 | 3/1968 | Maurer et al. | 74/421 |
| 3,590,652 | 7/1971 | Strang | 74/421 |
| 3,653,691 | 4/1972 | Bram | 403/368 X |
| 4,452,547 | 6/1984 | Thiel et al. . | |
| 4,626,114 | 12/1986 | Phillips | 384/584 |
| 4,630,690 | 12/1986 | Beasley et al. | 403/370 X |
| 4,884,916 | 12/1989 | Johnson, III | 403/370 |
| 4,906,125 | 3/1990 | Burstrom | 403/370 |
| 5,174,680 | 12/1992 | Nakamura et al. . | |
| 5,197,345 | 3/1993 | Rose | 74/421 R |
| 5,203,221 | 4/1993 | Logsdon . | |
| 5,538,356 | 7/1996 | Aarre et al. | 403/370 X |
| 5,667,333 | 9/1997 | Phillips | 403/369 |

FOREIGN PATENT DOCUMENTS

| | | |
|---|---|---|
| 272852 | 7/1965 | Australia . |
| 7013424 | 9/1971 | Germany . |
| 750826 | 6/1956 | United Kingdom . |

OTHER PUBLICATIONS

*Machine Design*, "Expanding Bushing Eliminates Keyways," vol. 43, No. 11, p. 67 (29 Apr. 1991).
An article entitled "Product Update: Wobble–Free Bushings for Shaft–to–Shaft Mounting," *Design Engineering* magazine, p. 12 (Oct. 1994).
A promotional publicational entitled "New Product Announcement: No Key and Wobble Free," *Stober News* (Oct. 1994).
Link–Belt catalog No. 9010, pp. 2 and 19 (1993), Model FX Bushings.
Service Instruction Manual published by Leroy–Somer, Inc. of Palatine, Illinois, p. 6, Parts List, Single/Double Reduction.
A publication of The American Pulley Company describing a product referred to as "The Shaft King," copyright date 1952.
Renold Gears catalog No. 0692 1E, p. 4, Helical Gear Units.
SALA catalog, p. 16 (Dec. 1992), Speed Reducer.

(List continued on next page.)

*Primary Examiner*—Kenneth J. Dorner
*Assistant Examiner*—Andrea Chop
*Attorney, Agent, or Firm*—Craig N. Killen; John M. Miller; John J. Horn

[57] ABSTRACT

An adaptable mounting arrangement is provided for securing a shaft to a hub of a speed reducer or other mechanical power transmission device. The hub is configured having a pair of tapered interior surfaces converging to a location approximately at the midpoint of an axial bore defined in the hub. A pair of counterbores are also defined in the interior surface of the hub at opposite axial ends thereof. One or more tapered sleeve members may be provided to engage the tapered interior surfaces defined in the hub. Alternatively, annular bushings may be provided in each of the counterbores when the hub is to be secured to a screw conveyor drive shaft or the like.

12 Claims, 7 Drawing Sheets

OTHER PUBLICATIONS

J.H. Fenner & Co. catalog, p. 8, copyright date 1900, Taper Grip.

A publication from Dorris Mfg. of St. Louis, MO, dated Dec. 13, 1991, Dorris Tapered Bushing.

Foote–Jones/Illinois Gear catalog No. PT–212H/7181F/15M/12–90/TR/AE, pp. 18–19 and 26, Tapered Bushing & Key Selection.

Browning catalog No. 11, pp. M–105 and M–106 (1991), Shaft Mount Reducers.

Dodge catalog No. DMR–291–1, published by Reliance Electric Co. of Greenville, SC, pp. G5–4 and G5–5, "Twin Tapered Bushings".

Bulletin 371–110, published by the Falk Corporation, pp. 2 and 3 (Dec. 1992), "Falk Drives".

Dodge catalog No. A–235–2, published by Reliance Electric Co. of Greenville, SC, p. G6–1, copyright date 1982, "Dodge Speed Reducers".

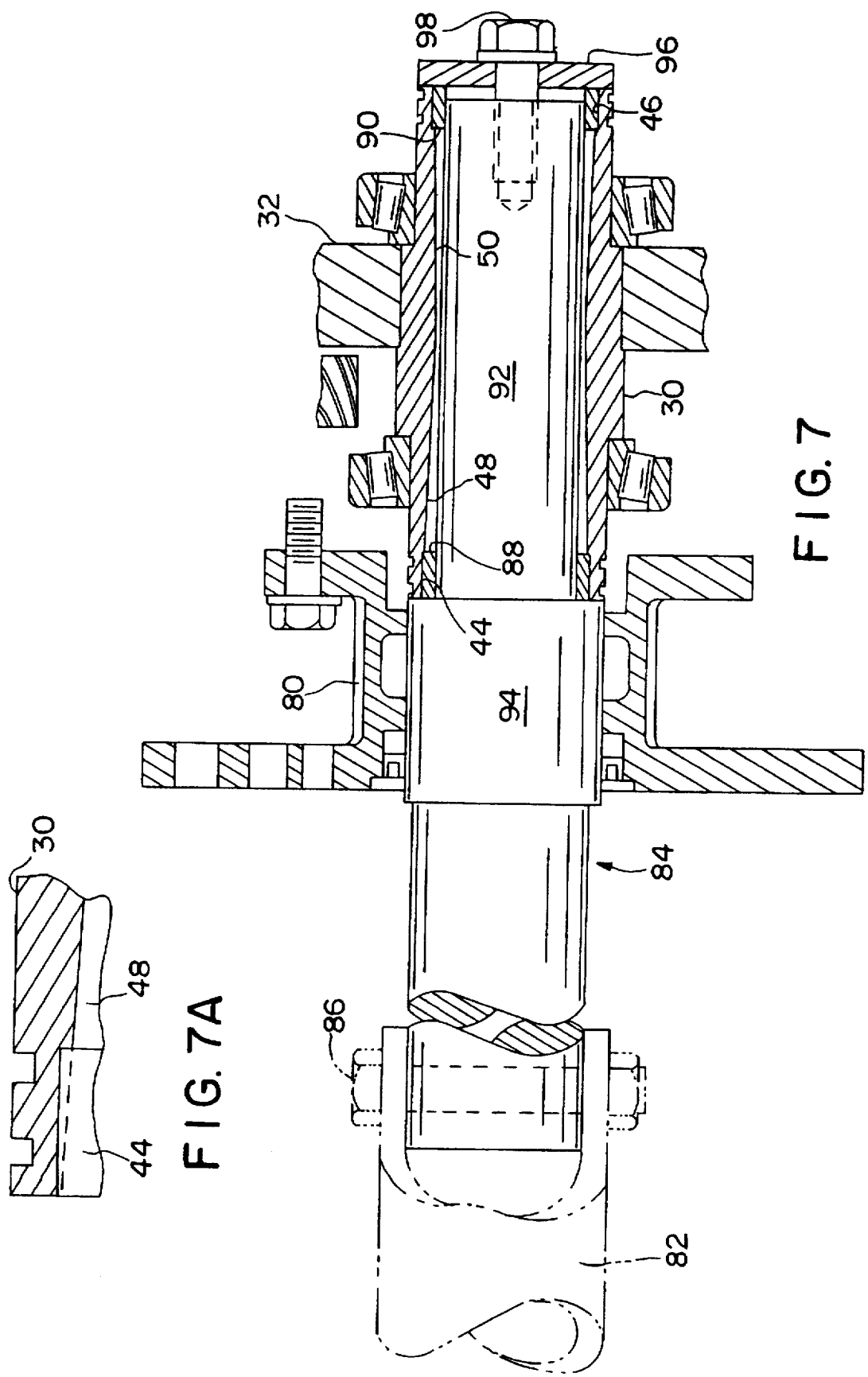

ADAPTABLE MOUNTING ARRANGEMENT FOR SHAFT-CARRIED SPEED REDUCER

This is a Continuation of application Ser. No. 08/468,363 filed Jun. 6, 1995 abandoned.

BACKGROUND OF THE INVENTION

The present invention relates generally to the art of speed reducers of the type including an output hub for mounting to a shaft to be driven. More particularly, the present invention relates to a mounting arrangement for such a speed reducer which is adaptable to a variety of shaft configurations.

In many applications, it is desirable to utilize a speed reducer which does not itself have an output shaft, but instead mounts to an existing shaft. For example, it will frequently be desirable to mount a speed reducer to a pulley shaft in a belt conveyor system. Typically, the shaft in this case may serve as the primary means by which the speed reducer is supported. An arm member may also be provided to resist torque which would otherwise tend to rotate the speed reducer housing about the output hub.

Various arrangements have been provided to secure the output hub of the speed reducer to the shaft. In a typical arrangement, the output hub includes one or more tapered surfaces on its interior. A sleeve member having a tapered exterior surface is moved into the hub to engage the tapered interior surface thereof. The sleeve member includes a slot which allows contraction about the shaft when the respective tapered surfaces are brought into engagement. Examples of such arrangements are shown in U.S. Pat. Nos. 4,626,114 to Phillips, and 3,590,652 to Strang, each incorporated herein by reference.

Similar speed reducers are often utilized in applications involving a screw conveyor. A screw conveyor typically includes an elongated auger mounted within an appropriate trough. The auger is driven by a shaft secured to the output hub of the speed reducer. In this case, the speed reducer itself typically serves to support one end of the shaft and auger. The other end of the auger is generally supported by an appropriate bearing at the opposite end of the trough. A particulate material, such as grain or sand, is conveyed down the trough by rotation of the auger.

The load imposed on the auger by the conveyed material will sometimes impart a significant axial force to the shaft. Because of the axial force imparted on the shaft, as well as the difficulty in machining a matching taper on the drive shaft, screw conveyor applications have typically not utilized tapered sleeve mounting arrangements such as that described above. Instead, a reduced diameter portion of a shaft is typically mounted in a straight hub such that a face of the hub abuts a shoulder defined on the shaft. A retaining plate is attached to the end of the shaft to abut the opposite face of the hub. This arrangement "sandwiches" the hub to resist the axial force imparted on the shaft by the conveyor.

In most other respects, such as the drive train, speed reducers utilized for general applications such as belt conveyors and speed reducers utilized with screw conveyors are substantially similar. However, the different mounting arrangements discussed above have required the installation of different output hubs depending on the application.

In addition, while prior art arrangements utilizing a tapered sleeve member have been effective at securing the output hub to a shaft, they have not been as versatile as would often be desirable. For example, an arrangement would be desirable which permitted the optional use of one or two tapered adapter sleeves. In addition, enhanced versatility would be provided by a single tapered sleeve that is mountable from either side of the speed reducer. It would also be desirable to provide an arrangement whereby the speed reducer may be secured to a shaft which does not extend completely through the output hub.

SUMMARY OF THE INVENTION

The present invention recognizes and addresses the foregoing disadvantages, and others, of prior art constructions and methods. Accordingly, it is an object of the present invention to provide an improved arrangement for securing a hub of a speed reducer to a shaft.

It is a further object of the present invention to provide an improved tapered sleeve mounting arrangement for a speed reducer hub.

It is a further object of the present invention to provide a tapered sleeve mounting arrangement which may selectively utilize one or two tapered sleeve members.

It is a further object of the present invention to provide a tapered sleeve mounting arrangement which may utilize a single tapered sleeve member mountable on either side of the speed reducer.

It is a further object of the present invention to provide a tapered sleeve mounting arrangement which may be mounted to a shaft which does not extend completely through the hub.

It is also an object of the present invention to provide an arrangement for securing a hub having at least one tapered interior surface which is adaptable to applications requiring a straight hub.

It is a more particular object of the present invention to provide a shaft mounting arrangement which may be utilized with either a shaft that supports the reducer, such as many belt conveyor shafts, or an arrangement in which the speed reducer supports one end of the shaft, as typified by the shaft of many screw conveyors.

Some of these objects are achieved by an adaptable arrangement for selectively mounting a mechanical power transmission apparatus to a rotatable shaft. The arrangement comprises a hub to be secured to the shaft for rotation therewith, the hub defining an axial bore having first and second counterbores adjacent respective ends of the axial bore. Further, the hub preferably includes first and second interior tapered portions converging together from a greater diameter adjacent a respective counterbore to a lesser diameter at approximately a midpoint of the axial bore. The counterbores preferably have a diameter no less than a reference diameter produced if tapered portions were uniformly extended from their greater diameter to a respective end of the axial bore.

The arrangement may further include at least one sleeve member for receipt about the rotatable shaft. Each such sleeve member preferably includes a flange portion at one end thereof and an exterior tapered portion defining an axial contraction slot. Securement means are also provided for axially moving the sleeve member and the hub together such that the complementary tapered surfaces thereof are forced into engagement, thereby securing the hub to the rotatable shaft.

In presently preferred embodiments, the securement means includes a plurality of spaced apart and axial through-bores defined in the flange portion of the sleeve member. A backing ring defining therein a plurality of threaded holes is mounted on the hub such that the threaded holes and the through-bores are in substantial register. A plurality of threaded members, such as bolts, are carried by the throughbores to engage the threaded holes defined in the backing ring.

In some applications, only a single sleeve member is utilized. In this case, the rotatable shaft may extend completely through the hub or may terminate inside of the hub. If the shaft extends completely through the hub, the sleeve member is preferably mounted on an outer side of the speed reducer. On the other hand, if the shaft does not extend completely through the hub, the sleeve member is preferably mounted on an opposite inner side of the speed reducer.

In other exemplary configurations, the arrangement includes a pair of sleeve members. In this case, the sleeve members are mounted in opposed axial directions to engage respective interior tapered portions of the hub.

The arrangement is also adaptable to be used in applications, such as a screw conveyor, requiring a straight hub. In this case, first and second annular bushings are provided for receipt in a respective counterbores. Such bushings define a cylindrical inner diameter for receipt about a cylindrical outer diameter of the rotatable shaft.

In screw conveyor applications and the like, the shaft is preferably configured as in the prior art to firmly engage the hub in a manner to resist axial force. Specifically, the shaft preferably has a stepped portion for juxtaposition adjacent a first outer face of the hub. A cylindrical portion having a reduced diameter with respect to the stepped portion is received in the axial bore of the hub. A suitable retainer, such as a retainer plate, is attached to the shaft for juxtaposition adjacent a second outer face of the hub.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 1 is a perspective view illustrating a speed reducer apparatus driving a pulley shaft of a belt conveyor or the like;

FIG. 7 is an enlarged view in partial cross section illustrating shaft securement as in FIG. 6; and FIG. 7A is an enlarged view in partial cross section showing details of a counterbore defined in an output hub of the speed reducer.

Figure 1:
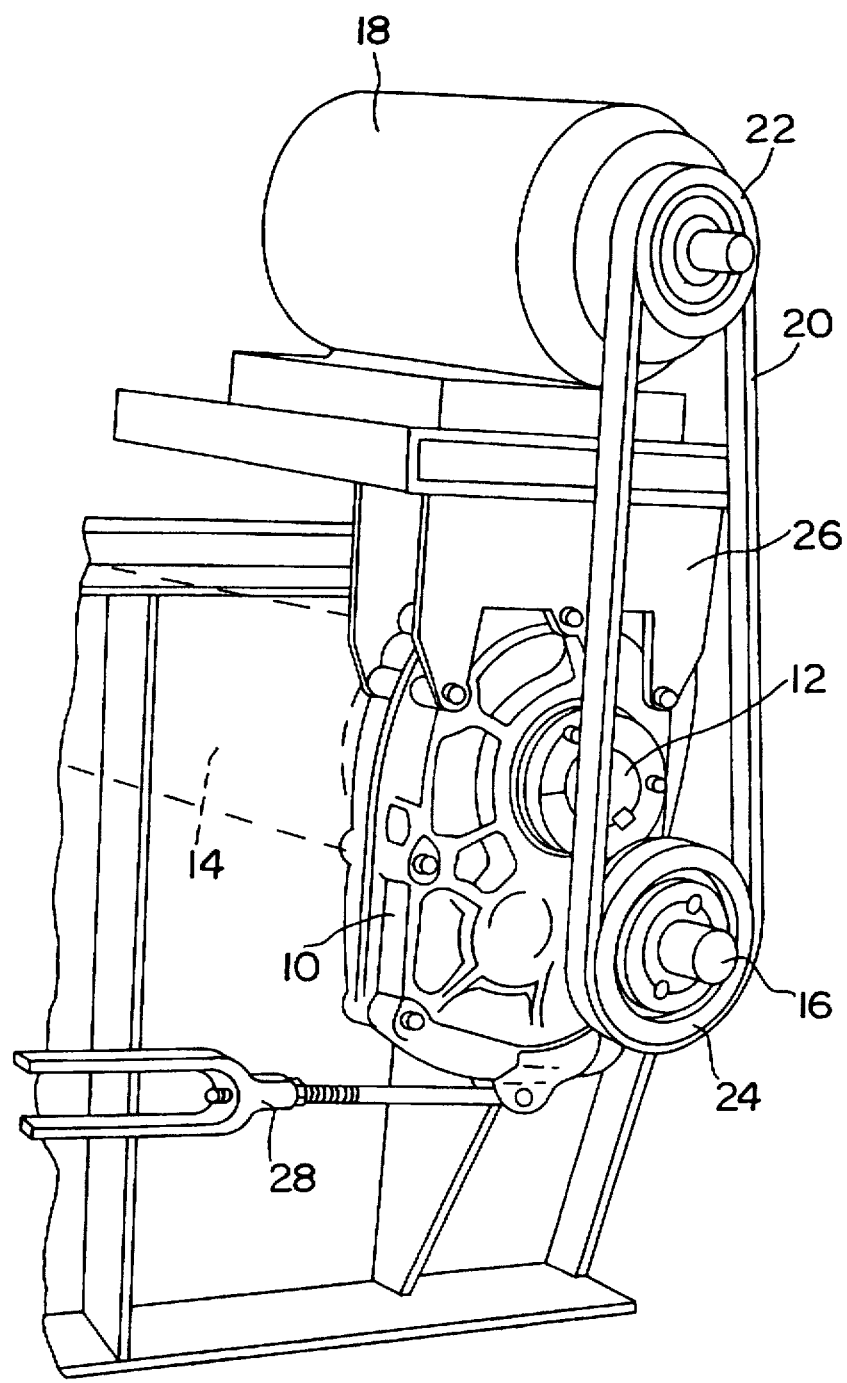

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Referring now to FIG. 1, a shaft-carried speed reducer 10 is illustrated in a typical application in which such devices are utilized. As is well known, speed reducers function generally to reduce the rotational speed of mechanical power received from a power source. Such reduction in rotational speed causes a concomitant increase in torque delivered to the load, as desired.

In this case, speed reducer 10 is shown driving a shaft 12 extending from a pulley 14 of a belt conveyor apparatus. Speed reducer 10 includes an input shaft 16 driven by a prime mover, here electric motor 18. Electric motor 18 is connected to input shaft 16 through a V-belt 20 extending about respective sheaves 22 and 24.

Often, substantially the entire weight of speed reducer 10 and associated equipment will be supported by the shaft on which it is secured. For example, in the illustrated embodiment, a bracket 26 is provided attached to speed reducer 10 to support electric motor 18. Thus, the weight of both speed reducer 10 and motor 18 is supported by shaft 12. An arm member 28 is provided to resist torque which would tend to rotate speed reducer 10 about shaft 12.

Figure 2:
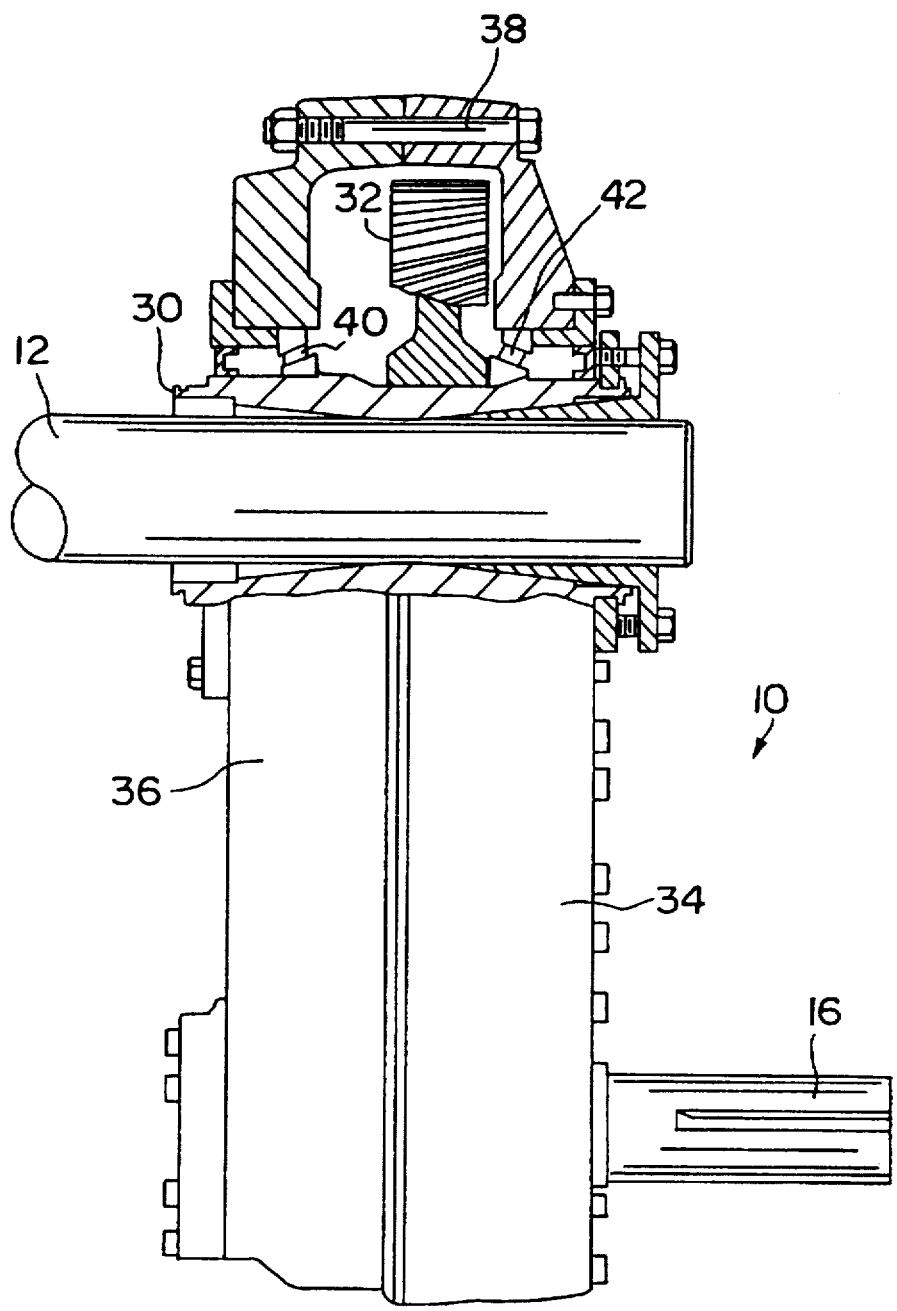
FIG. 2 is a side elevation of a speed reducer apparatus in partial cross section illustrating one manner of shaft securement according to the present invention.

As can be seen in FIG. 2, shaft 12 is secured to output hub 30 of speed reducer 10, which is secured to output gear 32. Output gear 32 is, in turn, driven from input shaft 16 by an appropriate gear train within the housing of speed reducer 10. As shown, the housing may be constructed having a front section 34 and a back section 36 mated together utilizing bolts, such as bolt 38. Hub 30 is rotatably supported in the reducer housing by suitable bearing assemblies, such as those indicated at 40 and 42.

Figure 3:
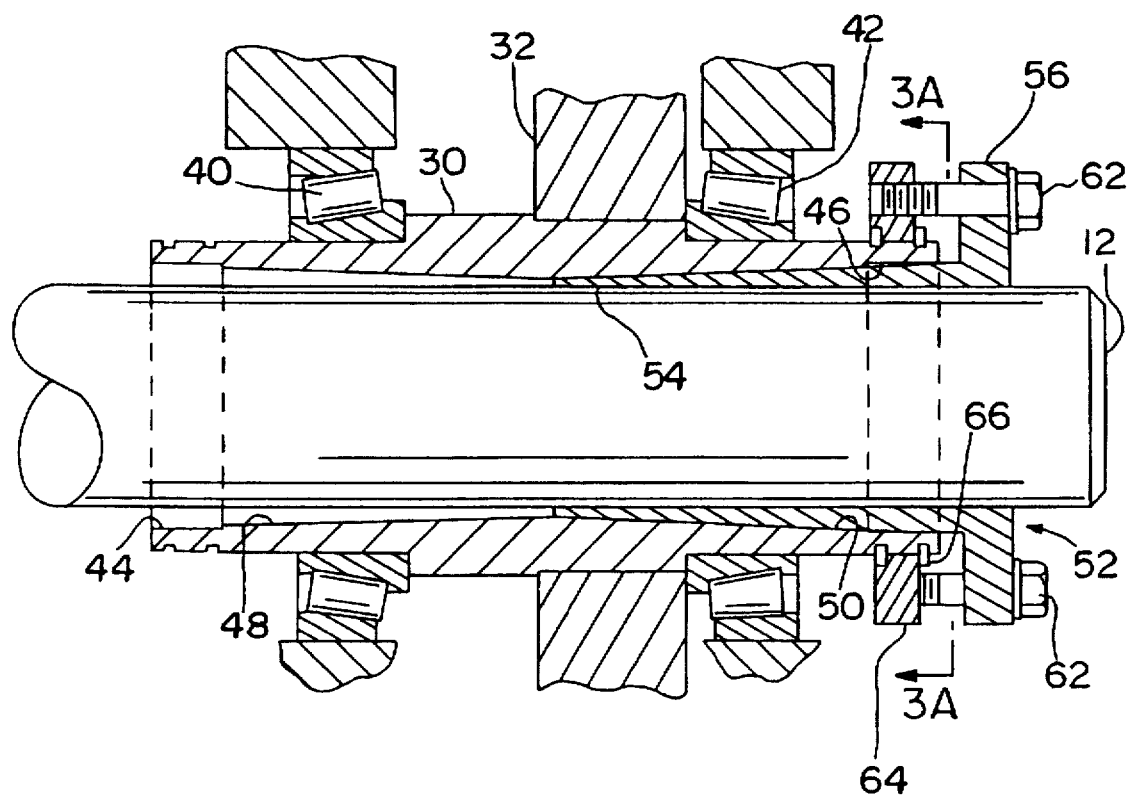
FIG. 3 is an enlarged view in partial cross section illustrating shaft securement as in FIG. 2.

Referring now to FIG. 3, the manner in which hub 30 is secured to shaft 12 may be most easily seen. As shown, the interior surface of hub 30 defines an axial bore having a pair of counterbores 44 and 46 adjacent respective ends thereof. From counterbores 44 and 46, respective tapered interior surfaces 48 and 50 converge to a location substantially at the midpoint of the axial bore defined in hub 30.

In addition, a sleeve member 52 having a tapered portion 54 and a flange portion 56 is received about shaft 12 for securing hub 30 thereto. As shown, tapered portion 54 has a substantially cylindrical interior surface and a tapered outer surface. It will be appreciated that the tapered exterior surface of flange portion 56 is substantially complementary to tapered interior surface 50.

Figure 3A:
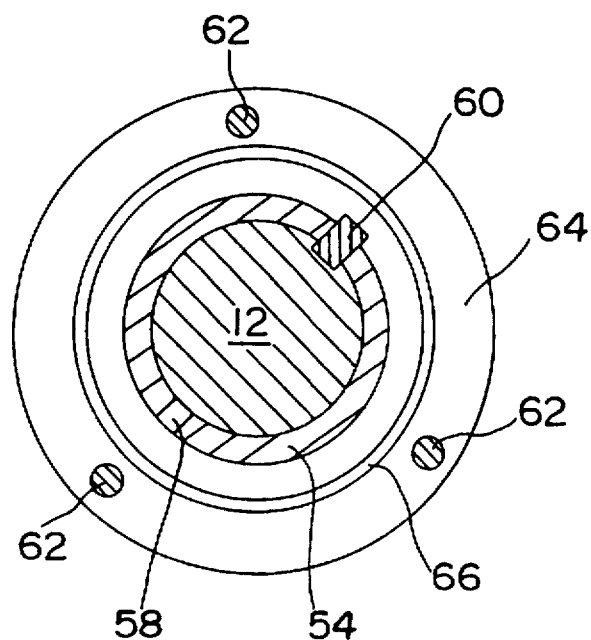
FIG. 3A is a cross sectional view as taken along line 3A—3A of FIG. 3.

As can be seen in FIG. 3A, a contraction slot 58 is defined in sleeve member 52 at least throughout the axial length of tapered portion 54. Thus, as the tapered exterior surface of tapered portion 54 is drawn into engagement with tapered interior surface 50, sleeve member 54 will contract about shaft 12 along the portion having slot 58.

FIG. 3A also illustrates key 60, which may be provided to prevent rotational slippage between shaft 12 and hub 30. As shown, key 60 is situated in appropriate keyways defined in shaft 12, tapered portion 54 and hub 30.

Securement means are provided to cause sleeve member 52 to be drawn into hub 30 in the manner described. In exemplary constructions, such securement means include a plurality of tightening bolts 62 extending through axial through-bores defined in flange portion 56. Bolts 62 engage threaded holes defined in a backing plate 64 which is mounted to hub 30.

Preferably, backing plate 64 is a separate element from hub 30. In this case, backing plate 64 may be retained by one or more snap rings, such as snap ring 66, situated in annular grooves defined on the exterior surface of hub 30. This construction allows backing plate 64 to be rotated during assembly such that the threaded holes defined therein may be brought into substantial register with the through-bores of flange portion 56.

Unlike many prior art constructions, hub 30 includes a pair of oppositely-directed tapered interior surfaces, either of which can be used for shaft securement. In the example shown in FIG. 3, shaft 12 extends completely through hub 30. As a result, sleeve member 52 can be conveniently installed from the outer side of speed reducer 10 with respect to the application equipment, such as the conveyor. This eliminates the need for the installer to attempt installation from behind speed reducer 10 which, it will be appreciated, is often difficult in the field.

Figure 4:
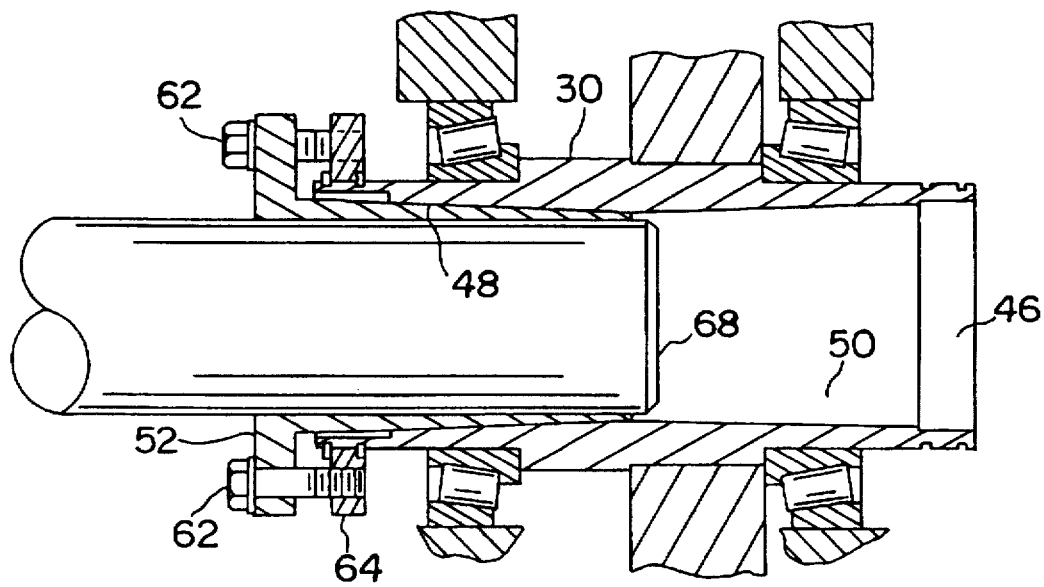
FIG. 4 is an enlarged partial cross sectional view illustrating a first alternative shaft securement technique according to the present invention.

In some applications, however, it may be necessary to effect installation from behind speed reducer 10, which the illustrated construction will also optionally allow. For example, FIG. 4 illustrates a situation in which speed reducer 10 is to be installed on a short shaft 68. Specifically, due to its short length, shaft 68 terminates in the interior of hub 30, as shown. Hub 30 is secured to shaft 68 in this case by installing sleeve member 52 to engage tapered interior surface 48, instead of tapered interior surface 50. Many prior art constructions required that the shaft extend completely through the hub and could therefore not be utilized in this situation.

Figure 5:
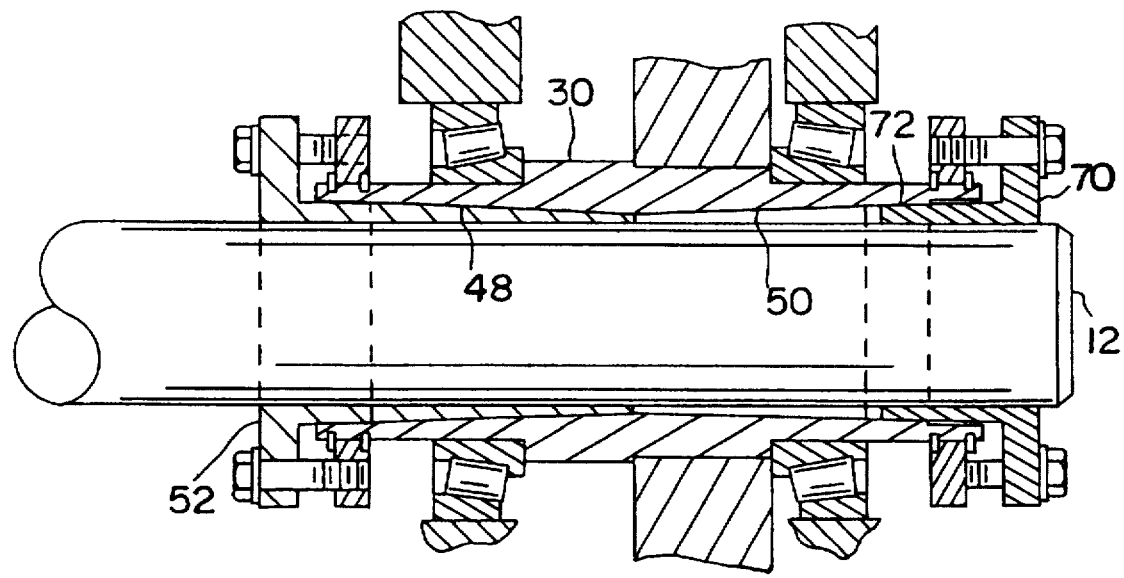
FIG. 5 is an enlarged partial cross sectional view illustrating a second alternative shaft securement according to the present invention.

As demonstrated by the above, the illustrated construction allows sleeve member 54 to be installed from either side of speed reducer 10. In some situations, it may be desirable to provide the additional clamping force which can be achieved using two sleeve members. Thus, FIG. 5 illustrates an application in which an auxiliary sleeve member 70 is also provided.

If desired, auxiliary sleeve member may be identical to sleeve member 52. In the illustrated embodiment, however, sleeve member 70 is constructed having a truncated tapered portion 72. Sleeve member 70 will act as a stabilizer against small transverse movements of shaft 12 in applications where such is desired. It should be appreciated that the respective positions of sleeve member 52 and sleeve member 70 could also be reversed.

Figure 6:
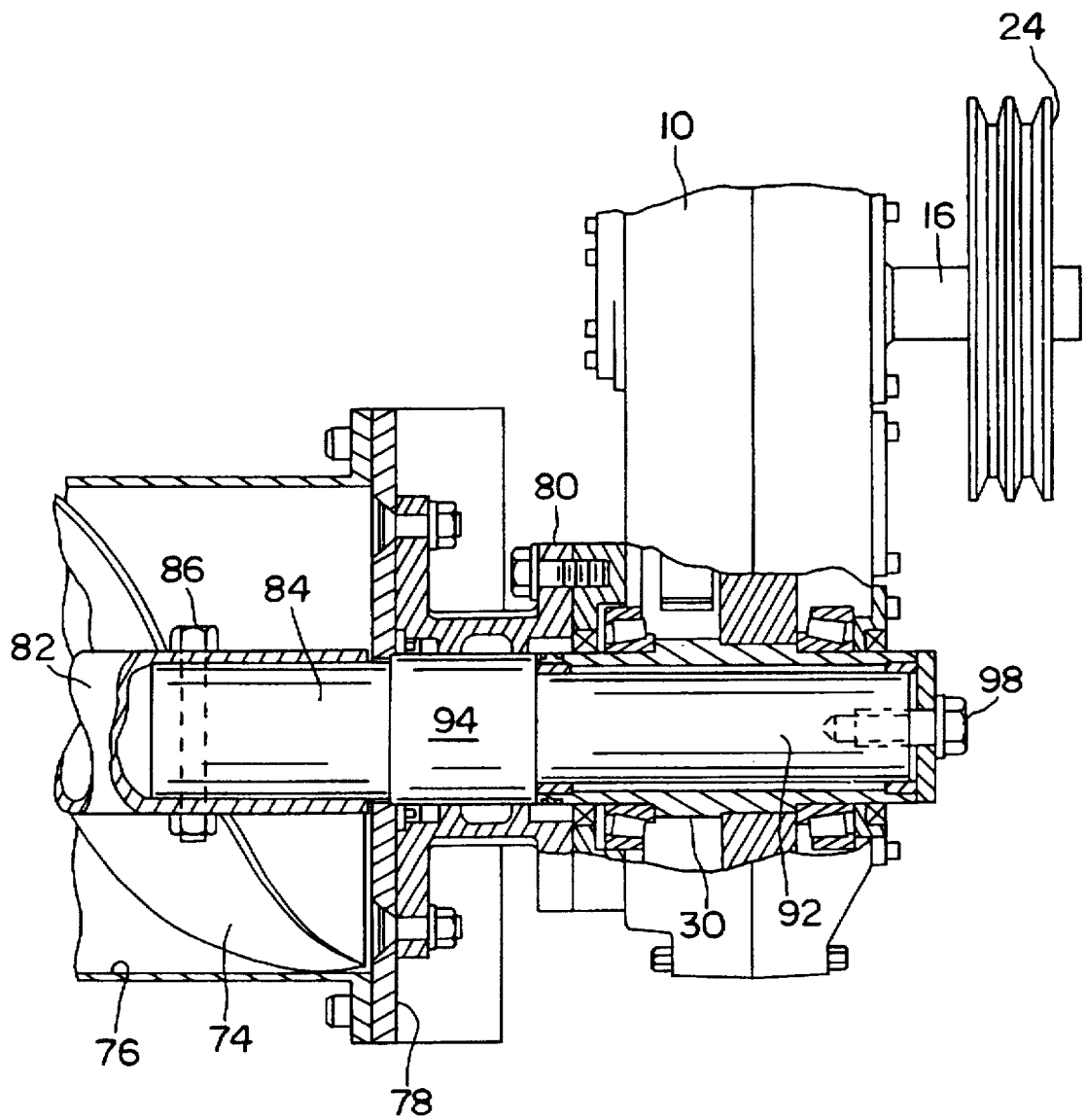
FIG. 6 is a side elevation of a speed reducer apparatus in partial cross section illustrating attachment to a screw conveyor shaft.

Referring now to FIG. 6, speed reducer 10 is shown installed in an application utilizing a screw conveyor. As can be seen, the screw conveyor includes a rotatable auger 74 situated within a trough 76. Trough 76 includes an end plate 78 having a mounting bracket 80 attached thereto. The housing of speed reducer 10 is attached to mounting bracket 78, as shown.

Auger 74 includes a tubular portion 82 to which a drive shaft 84 is connected. In this regard, drive shaft 84 partially extends into tubular portion 82 and is retained by one or more (generally two) transverse through-bolts such as bolt 86. Thus, as shaft 84 is driven, auger 74 will be rotated to move the particulate material located in trough 76.

As can be most easily seen in FIG. 7, tapered interior surfaces 48 and 50 are not utilized in this case to achieve securement of hub 30 to shaft 84. Instead, annular bushings 88 and 90 are installed in respective counterbores 44 and 46. As shown, bushings 88 and 90 have a substantially cylindrical inner diameter to receive a reduced diameter portion 92 of shaft 84.

To "sandwich" hub 30, shaft 84 further includes a stepped portion 94 engaging a first outer face of hub 30. The opposite outer face of hub 30 is engaged by a retaining plate 96 attached to the end of shaft 84. Preferably, retaining plate 96 is attached to shaft 84 utilizing a bolt 98 threadingly engaging a suitable hole which has been tapped into reduced diameter portion 92.

It can thus be seen that the illustrated construction is adaptable to use either tapered sleeve securement or "sandwiched" securement, depending on the requirements of a particular application. It will be appreciated that counterbores 44 and 48 should be configured to prevent interference with a tapered sleeve, when such is utilized. Thus, as shown in FIG. 7A, counterbore 44 has an inner diameter which is greater than a hypothetical diameter produced by extension of tapered interior surface 48 to the end face of hub 30. It should be understood that counterbore 46 is similarly constructed.

While preferred embodiments of the invention have been shown and described, modifications and variations may be made thereto by those of ordinary skill in the art without departing from the spirit and scope of the present invention, which is more particularly set forth in the appended claims. For example, it may be desirable to provide an embodiment of the output hub including two converging tapered interior surfaces without counterbores. It may also be desirable to provide a pair of counterbores in an output hub having only a single tapered interior surface.

In addition, it should be understood that aspects of the various exemplary constructions may be interchanged both in whole or in part. Furthermore, those of ordinary skill in the art will appreciate that the foregoing is by way of example only, and is not intended to be limitative of the invention so further described in such appended claims.

What is claimed is:

1. An adaptable arrangement for selectively mounting a mechanical power transmission apparatus to a rotatable shaft, said arrangement comprising:

a hub configured to be secured to said shaft for rotation therewith, said hub defining an axial bore having first and second counterbores adjacent opposite first and second ends of said axial bore, respectively, said counterbores sized for receiving respective shaft support elements;

said hub further having first and second interior tapered portions converging together from a greater diameter adjacent a respective counterbore of said first and second counterbores to a lesser diameter at an interior location of said axial bore;

said counterbores having a diameter no less than a reference diameter produced if the taper of said first and second tapered portions were uniformly extended from said greater diameter to a respective end of said axial bore;

at least one sleeve member configured for receipt about said rotatable shaft, said sleeve member being configured to contact said shaft and at least one of the tapered portions of said hub when interposed therebetween; and at least one bushing member configured for receipt about said rotatable shaft, said bushing member being configured to contact said shaft and at least one of the counterbores of said hub when interposed therebetween;

7 whereby said hub is configured for coupling to said shaft by interposition of said at least one sleeve member or said at least one bushing member between said shaft and said hub.

2. An adaptable arrangement as in claim 1, further comprising securement means for axially moving together said sleeve member and said hub such that said sleeve member will engage one of said first and second interior tapered portions of said hub, thereby securing said hub to said rotatable shaft.

3. An adaptable arrangement as in claim 2, wherein said at least one sleeve member comprises a single sleeve member.

4. An adaptable arrangement as in claim 2, wherein said at least one sleeve member includes a pair of sleeve members for mounting in opposed axial directions to engage respective of said first and second interior tapered portions of said hub.

5. An adaptable arrangement as in claim 1, wherein said at least one bushing member includes first and second annular bushings for receipt in respective counterbores of said first and second counterbores, said bushings having a cylindrical inner diameter for receipt about a cylindrical outer diameter of said shaft.

6. An adaptable arrangement as in claim 1, wherein said hub defines a keyway and further including a key therefor.

7. An adaptable arrangement for selectively mounting a mechanical power transmission apparatus to a rotatable shaft, said arrangement comprising:

a hub to be secured to said shaft for rotation therewith, said hub defining an axial bore having first and second counterbores adjacent opposite first and second ends of said axial bore, respectively;

said hub further having first and second interior tapered portions converging together from a greater diameter adjacent a respective of said first and second counterbores to a lesser diameter at approximately a midpoint of said axial bore;

said counterbores having a diameter no less than a reference diameter produced if the taper of said first and second tapered portions were uniformly extended from said greater diameter to a respective end of said axial bore;

at least one sleeve member for receipt about said rotatable shaft, said sleeve member having a flange portion at one end of said sleeve member and an exterior tapered portion defining an axial contraction slot; and securement means for axially moving together said sleeve member and said hub such that said exterior tapered portion of said sleeve member will engage one of said first and second interior tapered portions of said hub, thereby securing said hub to said rotatable shaft, wherein said securement means comprising:

(a) a plurality of spaced apart and axial through-bores defined in said flange portion of said sleeve member;

(b) a backing ring mounted on said hub, said backing ring defining therein a plurality of threaded holes in substantial register with said through-bores of said sleeve member; and (c) a plurality of threaded members carried by said through-bores of said sleeve member and engaging said threaded holes of said backing ring.

8. A speed reducer apparatus of the type to be mounted on a rotatable shaft for transmitting mechanical power thereto, said apparatus comprising:

a housing;

8 an input shaft extending from said housing for connection to a source of mechanical power;

an output hub to be secured to said rotatable shaft for rotation therewith, said hub being driven by rotation of said input shaft;

said hub defining an axial bore having first and second counterbores adjacent respective ends of said axial bore;

said hub further having at least one interior tapered portion converging from a greater diameter adjacent one of said counterbores to a lesser diameter at an interior location of said axial bore;

said one of said counterbores adjacent said greater diameter of said tapered portion having a diameter no less than a reference diameter produced if the taper thereof were uniformly extended from said greater diameter to an adjacent end of said axial bore; and first and second annular bushings for receipt in respective of said first and second counterbores, said bushings having a cylindrical inner diameter for receipt about a cylindrical outer diameter of said rotatable shaft.

9. A speed reducer apparatus as in claim 8, wherein said at least one tapered portion defined in said axial bore includes first and second interior tapered portions converging together from a greater diameter adjacent a respective of said first and second counterbores to a lesser diameter at approximately a midpoint of said axial bore.

10. A speed reducer apparatus of the type to be mounted on a rotatable shaft for transmitting mechanical power thereto, said apparatus comprising:

a housing;

an input shaft extending from said housing for connection to a source of mechanical power;

an output hub to be secured to said rotatable shaft for rotation therewith, said hub being driven by rotation of said input shaft;

said hub defining an axial bore therethrough having first and second interior tapered portions converging together from a greater diameter near respective ends of said hub to a lesser diameter at approximately a midpoint of said axial bore;

said hub including first and second counterbores adjacent respective opposite first and second ends of said axial bore, said counterbores having a diameter no less than a reference diameter produced if the taper of said first and second tapered portions were uniformly extended from said greater diameter to said end of said axial bore; and first and second annular bushings for receipt in respective of said first and second counterbores, said bushings having a cylindrical inner diameter for receipt about a cylindrical outer diameter of said rotatable shaft.

11. An arrangement comprising:

a hub defining an axial bore having first and second counterbores adjacent opposite first and second ends of said axial bore, respectively;

a rotatable shaft having a stepped portion for juxtaposition adjacent a first outer face of said hub and a cylindrical portion for receipt in said axial bore;

a retainer attached to said rotatable shaft for juxtaposition adjacent a second outer face of said hub;

said hub further having first and second interior tapered portions converging together from a greater diameter adjacent a respective of said first and second counterbores to a lesser diameter at approximately a midpoint of said axial bore;

said counterbores having a diameter no less than a reference diameter produced if the taper of said first and second tapered portions were uniformly extended from said greater diameter to a respective end of said axial bore; and first and second annular bushings for receipt in respective of said first and second counterbores, said bushings having a cylindrical inner diameter for receipt about a cylindrical outer diameter of said rotatable shaft.

12. A speed reducer apparatus of the type to be mounted on a rotatable shaft for transmitting mechanical power thereto, said apparatus comprising:

a housing;

an input shaft extending from said housing for connection to a source of mechanical power;

an output hub to be secured to said rotatable shaft for rotation therewith, said hub being driven by rotation of said input shaft;

said hub defining an axial bore having first and second counterbores adjacent opposite first and second ends of said axial bore, respectively, said counterbores sized for receiving respective shaft supporting bushings;

at least one substantially cylindrical shaft support bushing, said bushing being configured to be disposed in one of said counterbores and to contact said shaft and said hub to maintain the shaft and hub in a predetermined position with respect to one another;

said hub further having at least one interior tapered portion converging from a greater diameter adjacent one of said counterbores to a lesser diameter at an interior location of said axial bore; and said one of said counterbores adjacent said greater diameter of said tapered portion having a diameter no less than a reference diameter produced if the taper of said tapered portion were uniformly extended from said greater diameter to an adjacent end of said axial bore.

* * * * *